United States Patent
Funke et al.

(10) Patent No.: US 12,049,992 B2
(45) Date of Patent: Jul. 30, 2024

(54) ENTRY STEP LIGHTING SYSTEM FOR AIRCRAFT

(71) Applicant: Textron Aviation Inc., Wichita, KS (US)

(72) Inventors: Edward Francis Funke, Cheney, KS (US); Rebecca Rae Groninga, Maize, KS (US); Allan Dale Schrag, Wichita, KS (US)

(73) Assignee: Textron Innovations Inc., Providence, RI (US)

( * ) Notice: Subject to any disclaimer, the term of this patent is extended or adjusted under 35 U.S.C. 154(b) by 0 days.

(21) Appl. No.: 18/484,625

(22) Filed: Oct. 11, 2023

(65) Prior Publication Data

US 2024/0117950 A1    Apr. 11, 2024

Related U.S. Application Data

(60) Provisional application No. 63/379,068, filed on Oct. 11, 2022.

(51) Int. Cl.
*F21S 43/14* (2018.01)
*B64D 9/00* (2006.01)
*F21W 111/027* (2006.01)

(52) U.S. Cl.
CPC ............... *F21S 43/14* (2018.01); *B64D 9/00* (2013.01); *B64D 2203/00* (2013.01); *F21W 2111/027* (2013.01)

(58) Field of Classification Search
CPC .. F21S 43/14; F21S 43/15; B64D 9/00; B64D 2203/00; F21W 2111/027; F21V 7/00; F21Y 2101/00; F21Y 2103/10
See application file for complete search history.

(56) References Cited

U.S. PATENT DOCUMENTS

| | | | |
|---|---|---|---|
| 3,621,383 A * | 11/1971 | Rush | B64D 25/14 193/25 B |
| RE37,113 E | 3/2001 | Shimada | |
| 6,709,137 B1 | 3/2004 | Glovak et al. | |
| 9,499,093 B1 | 11/2016 | Salter et al. | |
| 2006/0267308 A1 | 11/2006 | Decker et al. | |
| 2019/0126873 A1 | 5/2019 | Baker | |
| 2020/0181956 A1 * | 6/2020 | Savidge | B64C 1/1423 |
| 2022/0388679 A1 * | 12/2022 | Palaniappan | B64D 25/14 |

* cited by examiner

*Primary Examiner* — Bao Q Truong
(74) *Attorney, Agent, or Firm* — Avek IP, LLC (57) ABSTRACT

An entry step lighting system for a deployable aircraft stairway. The system includes steps that having integrated light sources that direct and provide illumination to the steps. Some light sources illuminate strip lenses which indicate proximity to the step edges. Light emitted by a second group of light sources is directed into an angled face established on a riser wall between each step. The light bounces off of each angled face to illuminate the step below.

20 Claims, 11 Drawing Sheets

FIG. 10

ENTRY STEP LIGHTING SYSTEM FOR AIRCRAFT

CROSS-REFERENCE TO RELATED APPLICATIONS

This application claims the benefit of U.S. Provisional No. 63/379,068, filed Oct. 11, 2022, the entire contents of which are herein incorporated by reference.

BACKGROUND OF THE INVENTION

1. Field

The disclosed embodiments relate generally to the field of aircraft entry systems and methods. More specifically, the embodiments relate to systems and methods for illuminating aircraft stair arrangements.

2. Description of the Related Art

It is known to illuminate steps for various sorts of vehicles. For example, U.S. Patent Application Publication No. 2006/0267308 to Decker Jr. et al. describes a lighting assembly adapted for recreational vehicles. Decker also describes that the lighting assembly is a separate component from the step, and that the lighting assembly connects to the edge of the step.

Vehicle running board arrangements have also been outfitted with lighting arrangements. For example, U.S. Pat. No. 9,499,093 to Salter et al. describes a retractable automobile running board with a lighting system. U.S. Pat. No. 6,709,137 to Glovak et al. similarly describes a running board assembly.

U.S. Reissue Pat. No. RE37,113 to Shimada describes a lighting fixture for directing light using a prism to direct illumination along stairs. U.S. Patent Application Publication No. 2019/0126873 to Baker describes an attachable vehicle step pad for a vehicle bumper with a light assembly. It is also known for running board arrangements to include a downlighting arrangement having a reflective surface to illuminate a lower step on a stairway.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages will be apparent from the following detailed description of the embodiments and the accompanying drawing figures.

In some embodiments, the techniques described herein relate to a stairway lighting system for an aircraft entryway, including: a deployable aircraft staircase including a plurality of steps including a first step and a second step below and in front of the first step; one or more first light sources located underneath a first traction-enhancing surface on the first step, the one or more first light sources configured to direct illumination up through one or more strip lenses incorporated into the first traction-enhancing surface and create a step edge indication; one or more second light sources located underneath a front edge of the first traction-enhancing surface on the first step, the one or more second light sources being configured to direct illumination down onto a reflective face established into a riser existing below the first step, the reflective face being configured to reflect light received from the one or more second light sources and direct the light to illuminate a top surface of the second step.

In some embodiments, the techniques described herein relate to a stairway lighting system for an aircraft entryway, the system including: a stairway, the stairway including a plurality of steps wherein a first step in the plurality includes a first traction-enhancing surface and a lower second step in the plurality includes a second traction-enhancing surface; a first lighting module positioned underneath the first traction-enhancing surface of the first step, the first lighting module configured to illuminate a first laterally-extending lens; and a second lighting module located underneath the first traction-enhancing surface of the first step, the second lighting module configured to direct illumination downward onto the second step.

In some embodiments, the techniques described herein relate to a deployable aircraft stairway for aircraft, the stairway including: an upper step; a lower step; a reflective surface established on a wall rising up from a rear position of the lower step to a forward position underneath the upper step, the wall supporting the upper step; a first light source embedded in structures in the upper step and configured to illuminate a lens located at the front of the upper step; a second light source directing light onto the reflective surface established on the wall, the reflective surface configured to substantially illuminate the lower step.

BRIEF DESCRIPTION OF THE SEVERAL VIEWS OF THE DRAWINGS

Illustrative embodiments are described in detail below with reference to the attached drawing figures, which are incorporated by reference herein and wherein.

The drawing figures do not limit the invention to the specific embodiments disclosed and described herein. The drawings are not necessarily to scale, emphasis instead being placed upon clearly illustrating the principles of the invention.

DETAILED DESCRIPTION

The following detailed description references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the invention. The following detailed description is, therefore, not to be taken in a limiting sense. The scope of the invention is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments but is not necessarily included. Thus, the technology can include a variety of combinations and/or integrations of the embodiments described herein.

Embodiments provide systems and a method for lighting aircraft entryway stairs. Lighting fixtures are implemented into aircraft staircases. The fixtures are designed to illuminate stair edges to prevent passengers from stepping beyond the supporting surface, e.g., missing the stair. The system is created using an injection molded translucent lens material embedded into and over-molded by a step cap, e.g., a stair tread. Below the incorporated step cap lens is an upwardly-directed LED light strip. The light illuminates the translucent lens material, and thus indicates the edge of the entry step in dark environmental conditions, thereby increasing safety for passengers entering and exiting the aircraft. Additional lighting features illuminate downwardly through a translucent lens material from an overhanging portion of the step and are reflected by an angled riser portion such that the light is transmitted downwardly and forwardly onto the step immediately below and in front.

Figure 1A:
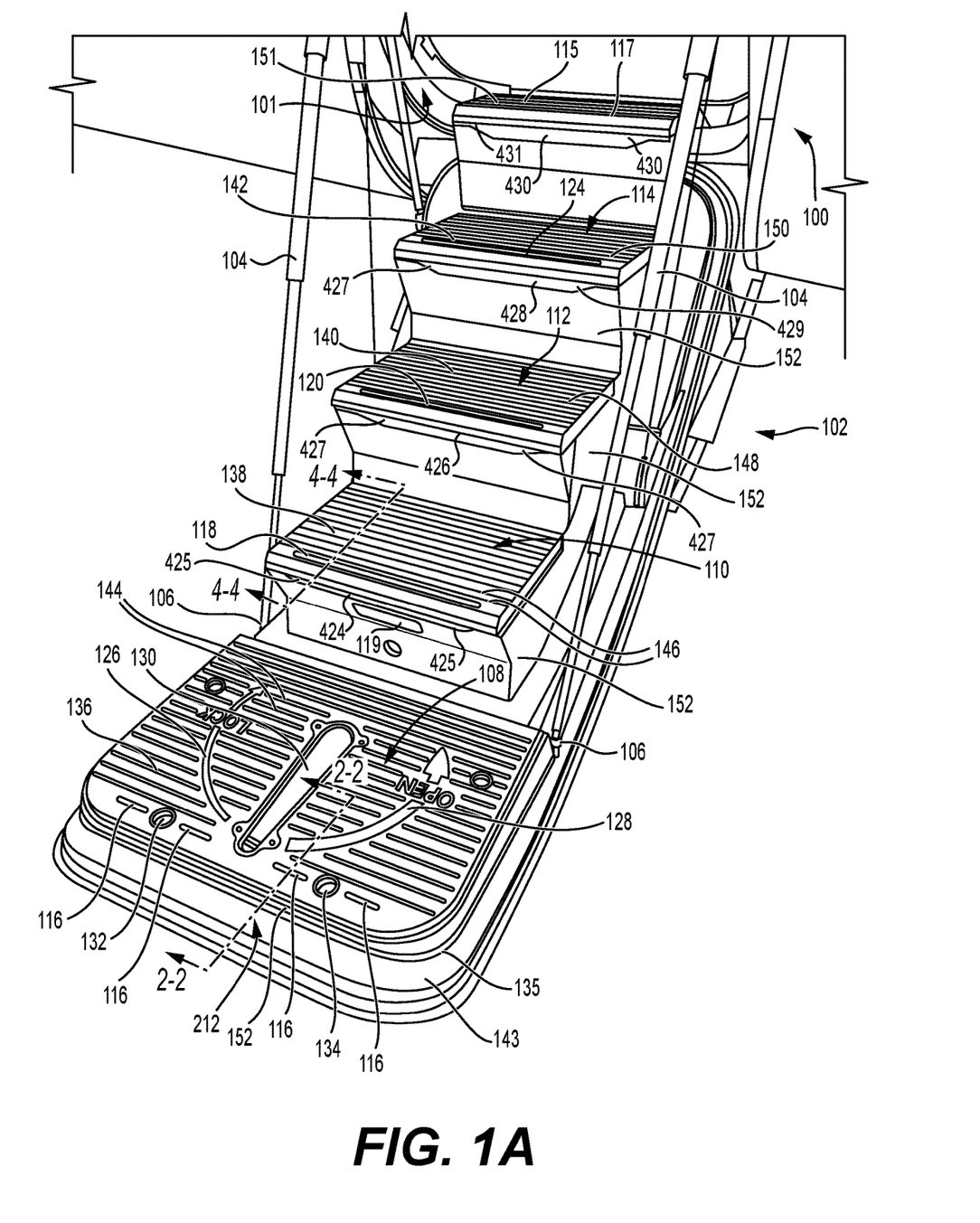
FIGS. 1A and 1B show perspective views of the stairs when deployed in an embodiment.
Figure 1B:
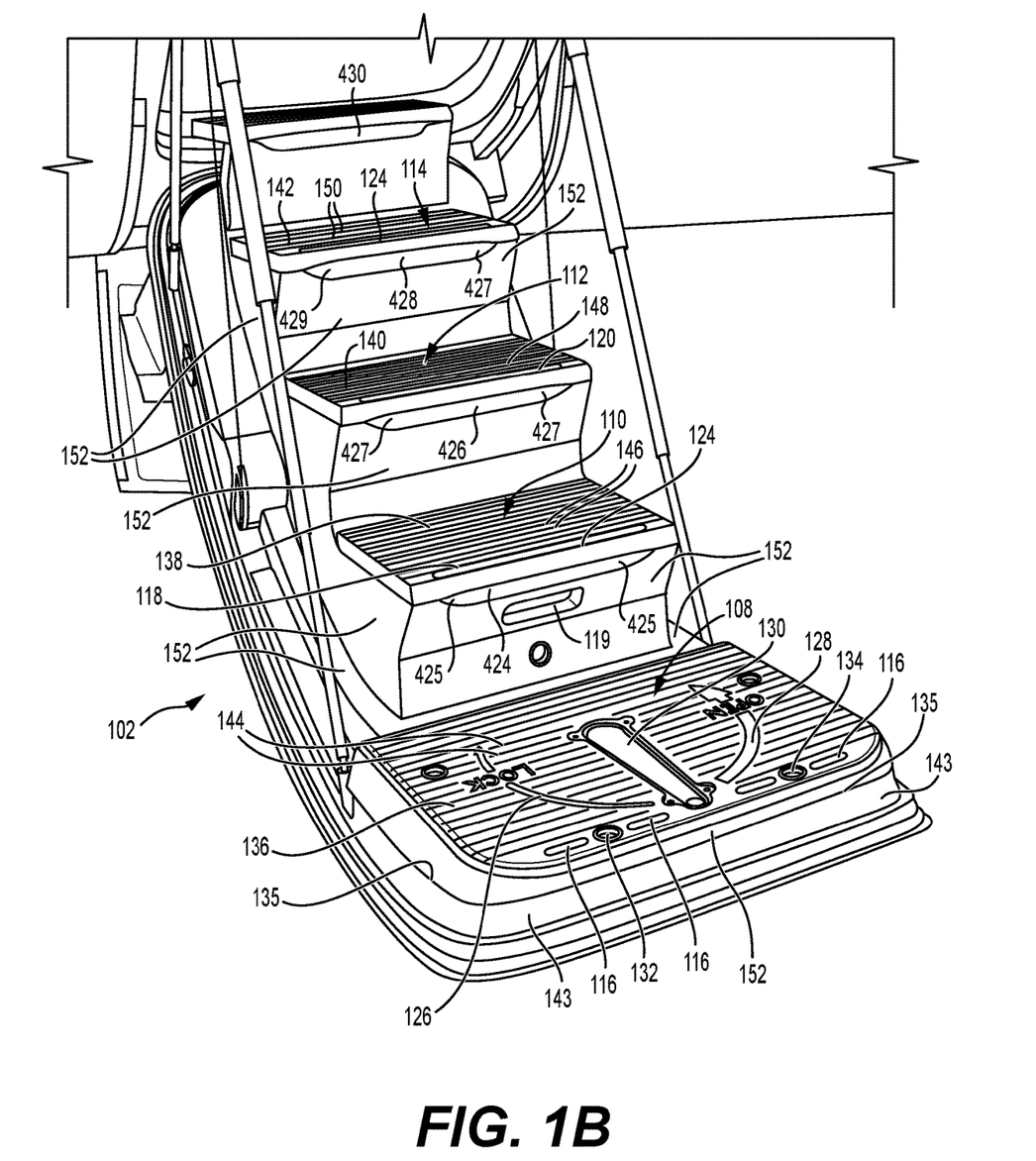

An embodiment is shown in FIGS. 1-10. Referring first to FIG. 1A and FIG. 1B, an aircraft 100 includes a doorway frame 101. A staircase 102 is mounted in the doorframe 101 when not deployed. When deployed, the staircase 102 rotates outward on a hinge (not shown) and is presented as shown in FIG. 1. Telescoping door supports 104 support the staircase 102 when deployed and are pivotally attached laterally on pivotal supports 106 located on a lower portion of the stairs. The telescoping door supports 104 are pivotally attached into the upper doorway (not shown) in a known manner such that the staircase 102 is suspended below the aircraft doorframe 101 as shown in FIG. 1.

In ascending order, as can be seen in FIG. 1, the staircase presents a bottom step 108, a next step 110 immediately above the bottom step 108, a next step 112 immediately above the step 110, a next step 114 immediately above step 112, and a top step 115. Top step 115 is folded up when the staircase is stowed but rotates to level and appears as in FIG. 1 when the staircase is deployed. Each of the five steps has a lighting arrangement associated therewith.

With respect to bottom step 108, the lighting arrangement includes four spaced apart upwardly-emitting apertures 116 each including lenses 202. As can be seen in FIGS. 1A and 1B, the relatively short strip lenses 202 are arranged around two forwardly-positioned sight glasses 132 and 134 (four site glasses are shown in total) and are also located around a forward portion of an outwardly hinged and rotatable handle 130. In FIGS. 1A and 1B, it can be seen that the door handle 130 is incorporated into the tread arrangement 136 of the step 108 such that the handle features when the handle is stowed and not in use are substantially level with the step tread 136. The upper surface of bottom step 108 also includes a clockwise (CW) rotation direction indicator 126 which will instruct a user inside the cabin how to lock the stairway in the frame by rotating an outwardly pivoting handle 130 (handle 130 pivots out to be actuated). Rotation of handle 130 (normally actuated by a user inside the cabin) compels pins outwardly to secure the staircase in the door frame. Another counter-clockwise (CCW) rotation direction indicator 128 shows a user inside the cabin which way to rotate the handle 130 to open the staircase (which, again, is acting as a door as well as stairs). Those skilled in the art will recognize that site glass devices like site glasses 132 and 134 reveal safety flags which provide indication of whether the securing pins in the door are engaged or not. The upper surface 136 of step 108 includes a plurality of lateral grooves 144 configured to stop short (internally) of the center handle assembly 130 and are completely nonexistent in the area of the lenses 202 at the front of the step 108. The lateral grooves 144 may create a traction-enhancing surface for a user stepping onto the bottom step 108.

Immediately above bottom step 108, step 110 includes a first upwardly-emitting lens strip 118 but also has a downwardly directed lighting arrangement, as do steps 112, 114, and 115 steps above step 110. These downwardly-directing lighting arrangements are not shown in FIG. 1, but disclosures in FIGS. 6-9 are illustrative of these downlighting features. The downlighting arrangements each illuminate the step area for the stair immediately in front. These areas of illumination for the downlighting arrangement underneath step 110 include the relatively large area on the upper areas of step 108, which receives forwardly and downwardly directed illumination from underneath an overhang at the front of step 110. Step 110 includes a handle 119 that is used for gripping to open and lower the door. Upper surface 138 of step 110 includes a plurality of lateral grooves 146 to help establish grip. The lateral grooves 146 establish a traction-enhancing surface for a user stepping onto and off of step 110 much like the lateral grooves 144 do for step 108.

The lighting arrangement on step 112 includes a second upwardly-emitting illumination lens strip 120 which is substantially identical to the lens-strip arrangement 118 in step 110. Step 112 also includes a downward and forwardly directed illumination strip just like the similar strip in step 110 (discussed in greater detail hereinafter). The upper surface 140 of step 112 includes a plurality of lateral grooves 148 which are substantially the same as what exist on step 110.

Step 114 includes a lighting arrangement that is substantially the same as the one disclosed for steps 110 and 112 where it possesses a third upwardly-emitting illumination strip 124, and a downward forwardly directing strip emitting from underneath a ledge at the front of step 114. Upper surface 142 of step 114 includes a plurality of lateral grooves 150 in an arrangement much like those for steps 110 and 112.

Top step 115 is arranged to fold up when the stairs are stowed but folds down into the position shown when the stairs are deployed. Thus, top step 115 is different than the other four steps for that reason but includes lighting arrangements substantially like those of steps 108, 110, 112, and 114 in all other respects. Thus, step 115 includes a fourth upwardly emitting illumination strip 117 on top of the step, and a downwardly and forwardly emitting arrangement underneath an overhanging front of the step 115 similar to steps 110, 112, and 114. Top step 115 also includes a plurality of traction-enhancing lateral grooves 151 like the other steps.

As can be seen in FIG. 1, the steps 108, 110, 112, and 114 are, upon deployment of the door, presented atop the door structures 143, which in embodiments, may include a fiberglass base 152.

Figure 2:
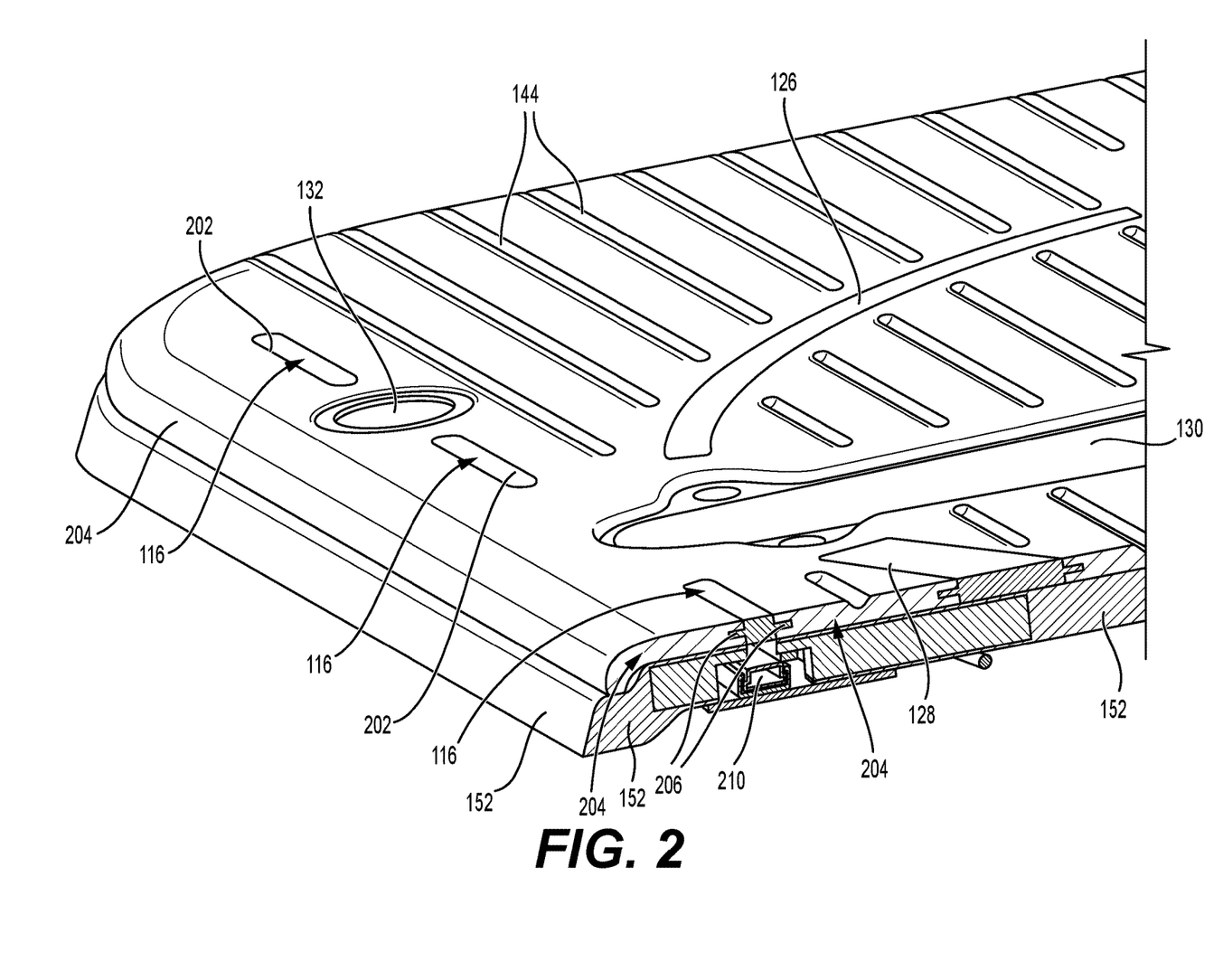
FIG. 2 is a perspective view of a sectional view taken from Section 2-2 in FIG. 1A.
Figure 3:
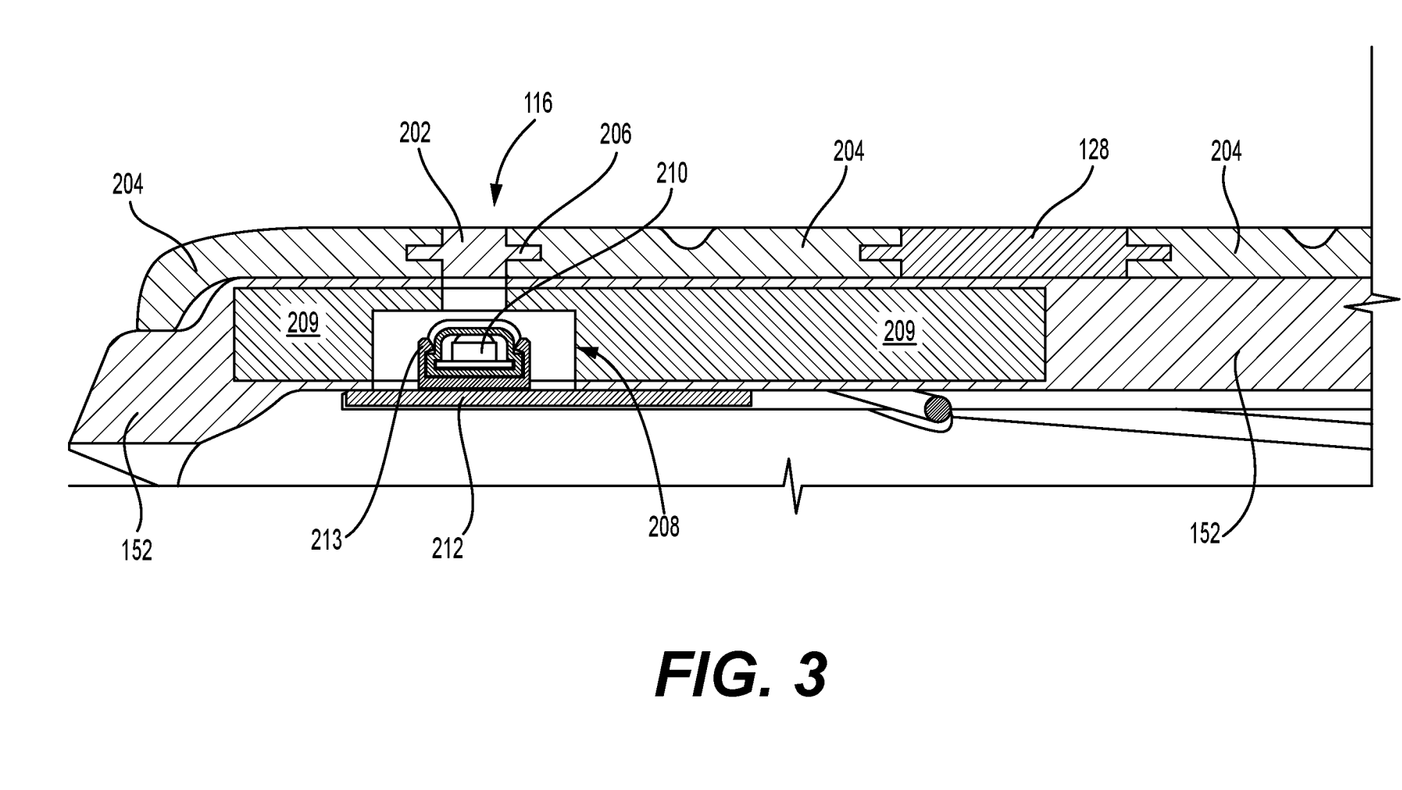
FIG. 3 is a side view of the section of FIG. 2.

The sectional views of FIGS. 2-3 show step 108 prior to installation in the staircase, and also reveal details regarding the internals of bottom step 108. In terms of installation, the bottom step 108 is bonded into place atop the fiberglass base 152 shown in FIGS. 1A and 1B. A rubber gasket 135 is, on an underside, bonded onto the fiberglass base 152 which supports the tread portion 204.

Referring first to FIG. 2, the figure shows a plurality of in-molded illumination strip lenses 202 on bottom step 108. In embodiments, the lenses 202 are translucent white. The translucency serves to sufficiently filter and diffuse light to avoid any glare but allow sufficient transmission such that the cover glows brightly enough in dark conditions to be clearly seen by a person entering or leaving the cabin using the stairs.

In-molded lens strips 202 are secured into an upper tread portion 204. In embodiments, the lens strips 202 are made of a transparent mix of polycarbonate (PC) and an amorphous polyester. In embodiments, the strips 202 are formed of a translucent white Xylex™ material. The tread portion 204, in embodiments, are formed of a thermoplastic polyurethane Desmopan®, as are all the other tread portions shown for steps 110, 112, 114, and 115 (in embodiments) and textured by the mold to create an ideal gripping surface, especially when wet. The translucent lens strips 202 each include outwardly extending flanges 206 which extend into the tread material to secure each strip 202. Grooves 150 are defined into the top of the tread material 204 to further enhance grip in addition to the high-friction materials employed.

The tread portion 204 is supported on top of the fiberglass base portion 152. Fiberglass base 152 is, in embodiments, a single piece. The tread material 204, as will be discussed hereinafter, is molded around the other parts. This includes the lenses and the directional indicators 126 and 128—all of which include flanges (e.g., flange 127)—as well as the fiberglass base 152.

Figure 4:
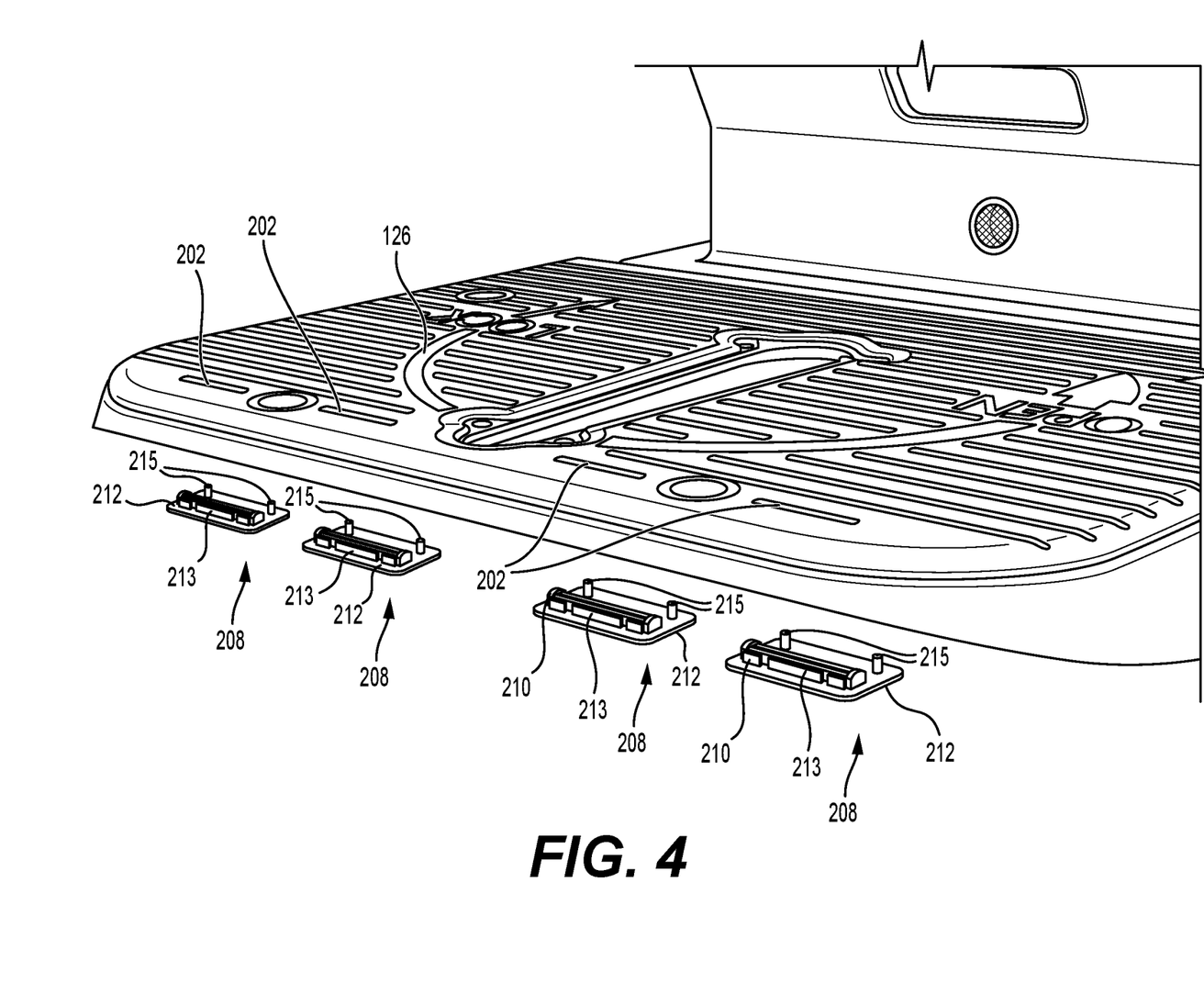
FIG. 4 shows an exploded view of the step of FIG. 2 taken at a perspective from slightly above the step with the LED arrangement exploded below.
Figure 5:
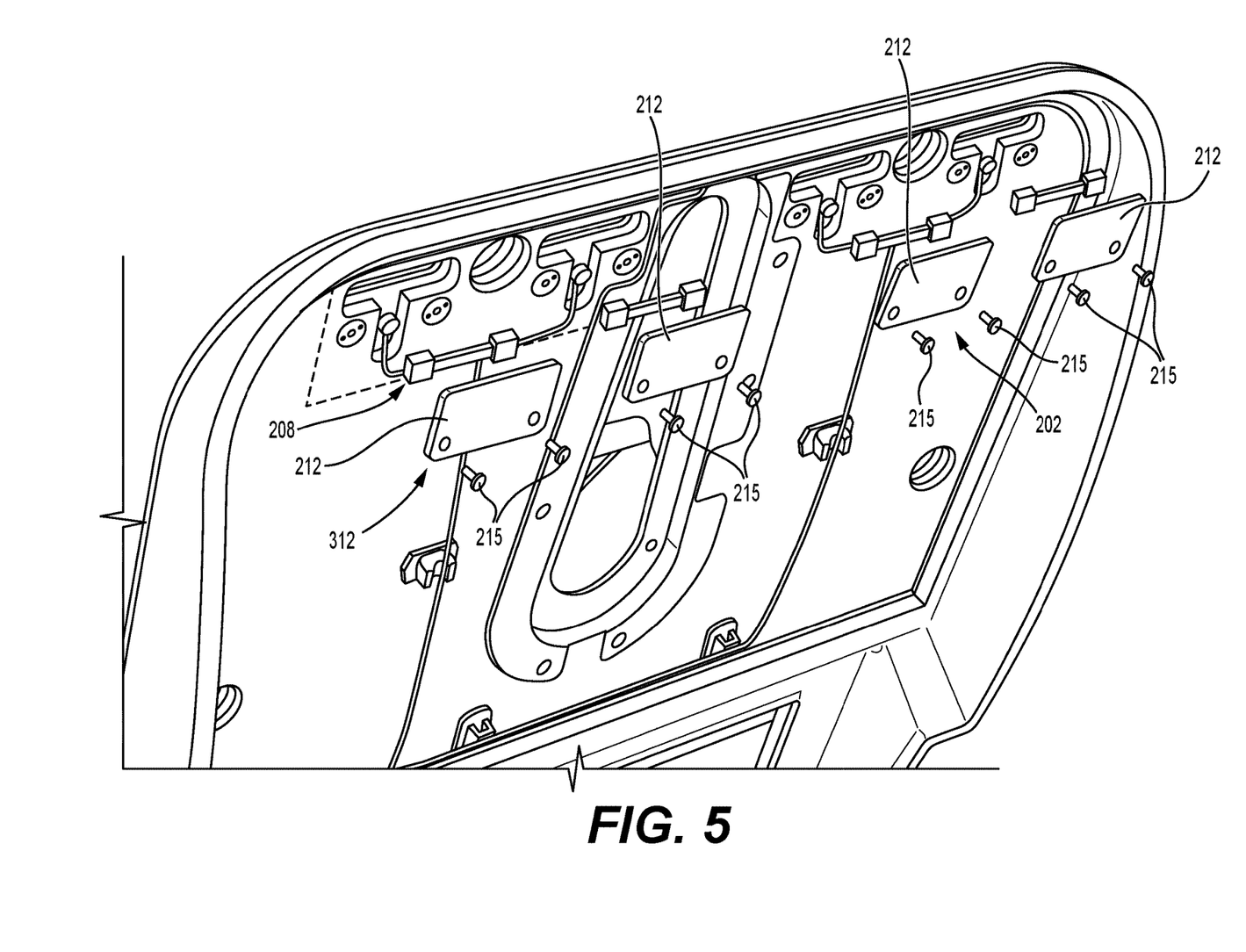
FIG. 5 shows an exploded view from below the step of FIG. 2.
Figure 6:
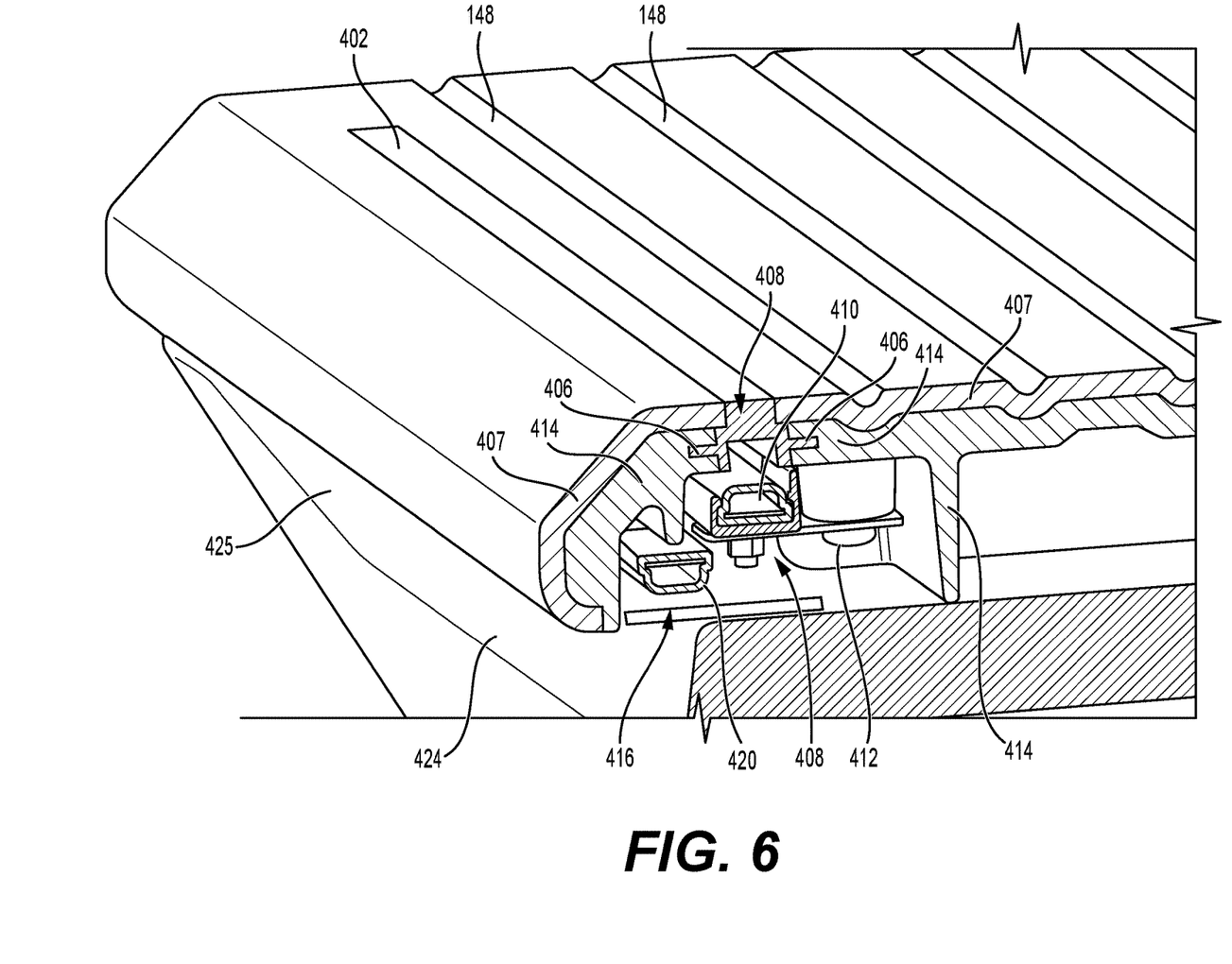
FIG. 6 is a perspective view of a step revealed in a sectional taken at 4-4 in FIG. 1A.
Figure 7:
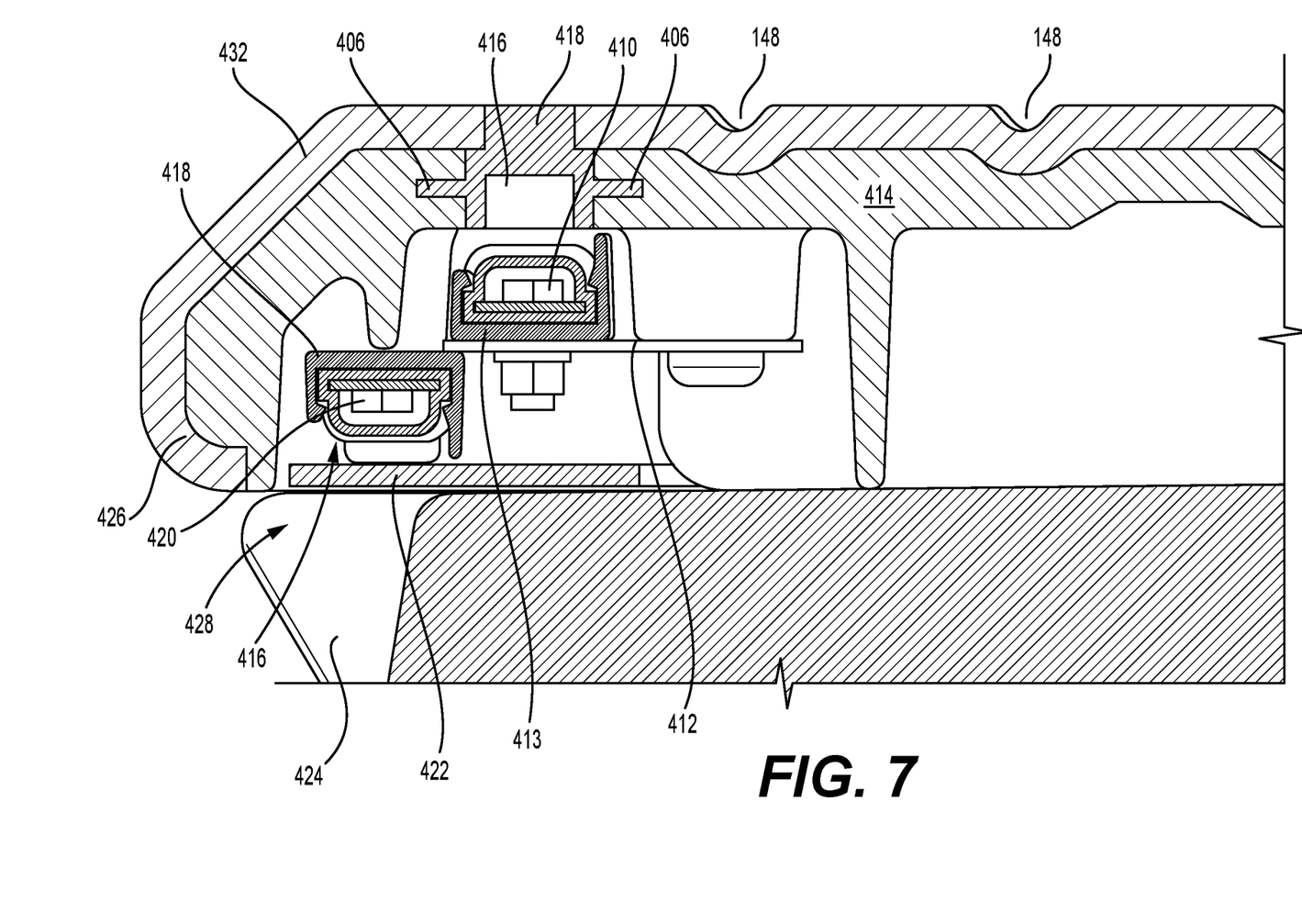
FIG. 7 is a side view of the section of FIG. 6.

FIGS. 4 and 5 depict how the lighting arrangement is configured using exploded views from above (FIG. 4) and below the step (FIG. 5). The lighting arrangement for step 108 includes four light modules 208. Light modules 208 are located below the tread material and are oriented to illuminate through the lenses 202. The modules 208 each include a series of LEDs 210, which each emit light in a conical pattern. The conical pattern is directed up from directly below the lenses 202. The LEDs 210 are each mounted on clips 213 paired on a metal plate 212 which spans a space 214 established in the module 208. The modules 208 are each secured underneath the initial step material 204 and within the confines of a base material 214 using a plurality of fasteners 215 (e.g., bolts or screws). In embodiments, low-lumen 5700 Kelvin LEDs could be used to comprise each of the upwardly-emitting LEDs 210 shown to great a glowing effect at night in each of the light strips without creating glare.

The fiberglass base portion 152 is manufactured according to a layup process such that core 209 is included and cured along with it.

In terms of processing, step 108 can be configured according to the following processes. A material such as Desmopan is molded over and substantially bonds the indicators 126 and 128 and the lenses 202 making up the tread portion 204. Tread portion 204 is bonded directly on top of fiberglass base 152. The lighting arrangement may then be installed to the bottom side of the fiberglass base 152. To do this, the LED strips 210, secured in clips 213, are adhered to the sheet metal plate 212 and screwed on to the core in an overlapping fashion as shown (see FIG. 5). Then the necessary local electrical connections are made (to the LED strips 210). Next, the assembly comprising step 108 is adhered onto a rubber seal/gasket 135 (see FIG. 1) and final electrical connections to an outside power source are made to complete the installation onto the inside of the metal door structures 143.

FIGS. 6-9 show the configuration details regarding identical steps 110, 112, 114 which also qualify as illustrative of the details regarding step 115, since the general configurations for each are substantially the same for all four of these steps in terms of internal light source arrangements, functions and structural arrangements. That said, step 110 (and also steps 112, 114, and 115) include translucent light diffusive lenses (e.g., single lens strip 402 on step 110). Referring to FIGS. 1A and 1B along with the sectionals of FIGS. 6-7, it can be seen that the single lens 402 extends laterally most of the width of the step front and is constructed much like the lenses on the bottom step 108 in that is it constructed of a translucent material and extends down through the tread material 407. Internally, the lens 402 includes a flange 406 that extends in both forward and rearward directions into the lateral aids in the fabrication step in the same manner that the lens flanges 206 did for the bottom step 108. Here, however, the flanges are received into an internal polycarbonate/acrylonitrile butadiene styrene (PC-ABS) cap frame structure 414 located underneath the tread material 407. The frame 414 is constructed of relatively rigid plastic and can be formed by injection molding.

Each of the steps 110, 112, and 114 are bolted on to the fiberglass base 152 to be secured in place.

Figure 8:
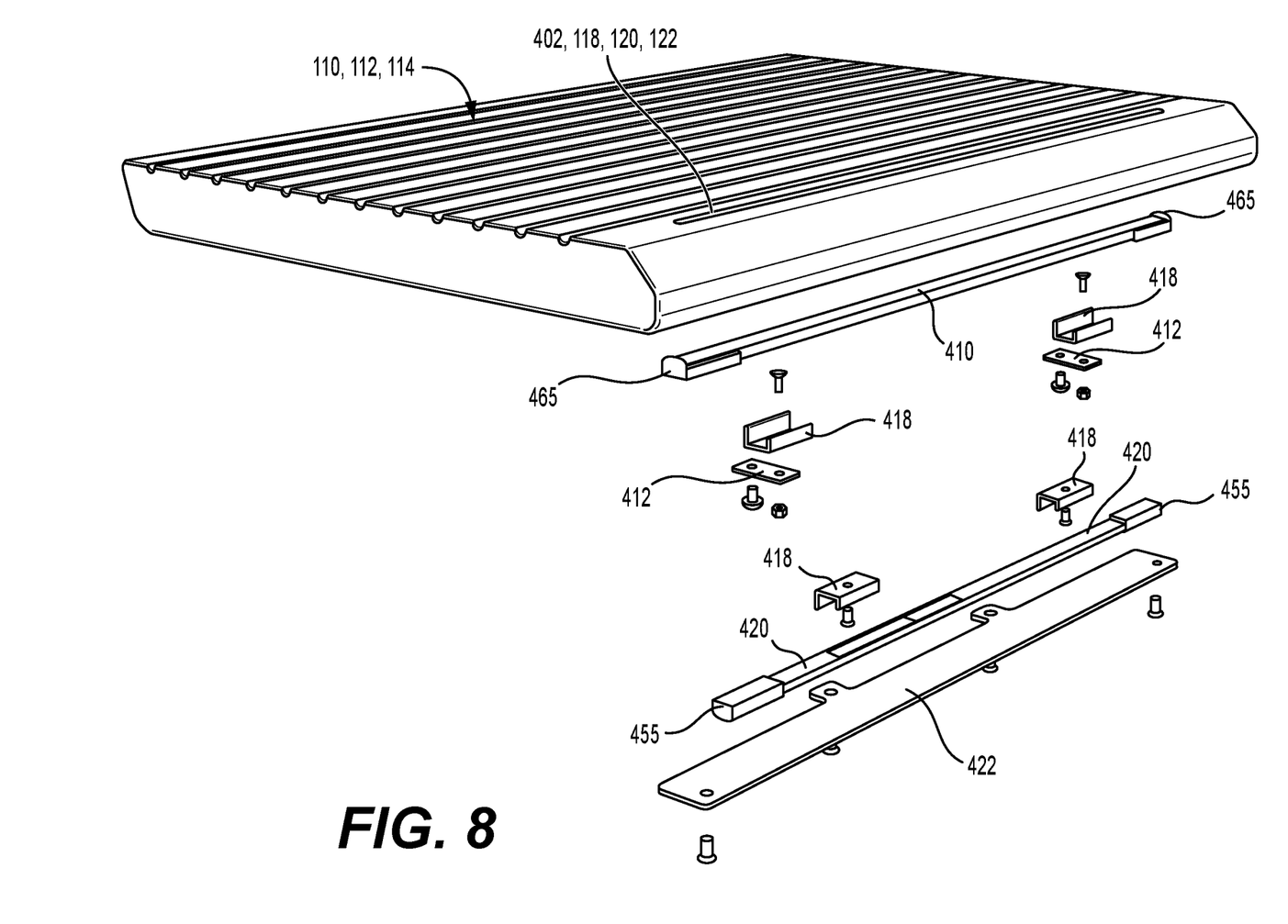
FIG. 8 shows an exploded view of the step of FIG. 6 taken at a perspective from slightly above the step revealing the LED arrangement extracted.
Figure 9:
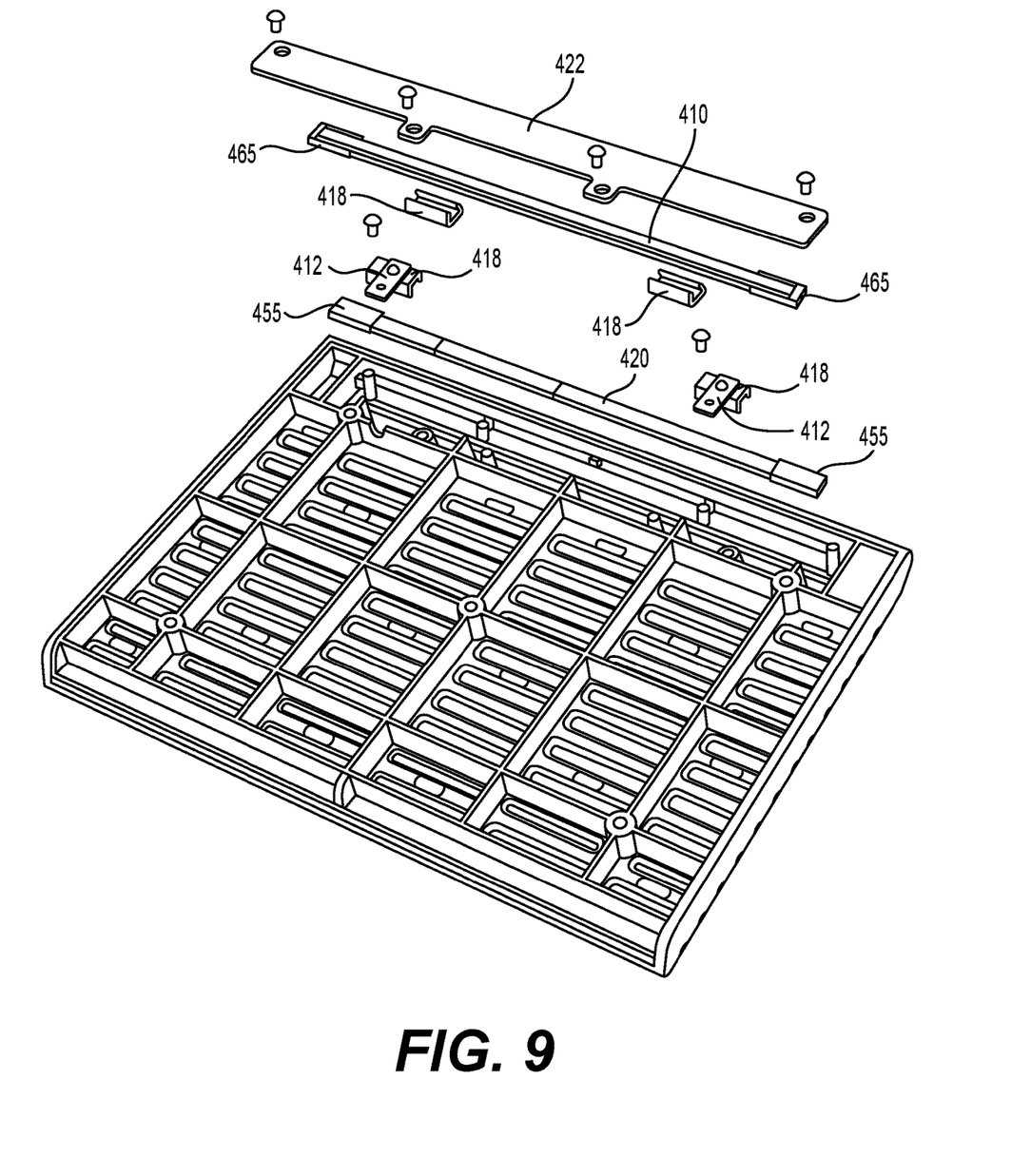
FIG. 9 shows an exploded view from below the step of FIG. 6 with the LED systems extracted.

The illumination passing through lens 402 is generated by a lighting assembly 408 which comprises a series of LEDs 410 (e.g., an LED strip) included between two end caps 465 (see FIG. 8). To be secured in the step, the LED strip 410 is received into and secured into a clip pair 418, each clip secured onto a respective metal plate 412 for installation (see FIGS. 8 and 9). The lens 402 is defined into the rigid plastic frame 421 during manufacture, and opposing flanges 406 are received in reciprocating voids established into the plastic frame 421 to accomplish structural securement.

Step 110 (as well as steps 112, 114, and 115) additionally includes a downwardly-directed lighting subsystem/module 416. The downlighting module 416 is contained laterally in end caps 455, the module 416 including a string of LEDs 420 which are secured underneath a hood portion 423. More specifically, the LED modules 416 are retained by a pair of inverted clips 418 which are fastened underneath the hood portion 423 of the frame 414. The LEDs 420 in the LED string are oriented to emit light vertically downward through a plate/light lens 422. Light lens 422 may, in embodiments, be constructed of transparent polycarbonate in sheet or plate form.

Once light is transmitted through the light lens 422, it encounters an angled face 424 that is located immediately below. Face 424 is angled slightly outwardly from top to bottom such that the light received from the LEDs 420 passing through lens 422 is reflected out onto the step surface below it so that a user can see step details while ascending or descending the steps. From the drawings (e.g., FIGS. 6 and 7) it may be seen that angled face 424 is incorporated into a chamfered arrangement where the angled face 424 is laterally inside to outwardly angled faces 425 (see FIG. 6).

As can be seen looking back to FIGS. 1A and 1B, in addition to step 110, steps 112, 114, and 115 also include downlighting arrangement. For example, underneath step 112, an angled forward face 426 and outwardly angled lateral faces 425, all of which receive light from a downlighting module (which is the same as downlighting module 416 in step 110) and present light out onto step 110 below it. Similarly, step 114 includes a substantially identical arrangement wherein a downlighting module underneath step 114 (not shown, but substantially identical to module 416) presents light onto a forward face 428 and outwardly angled faces 429 to illuminate step 112 below. Finally, underneath step 115 is a downlighting module (not shown, but substantially identical to module 416) which presents light onto an angled forward face 430 and outwardly angled faces 431 to illuminate step 114 below.

Figure 10:
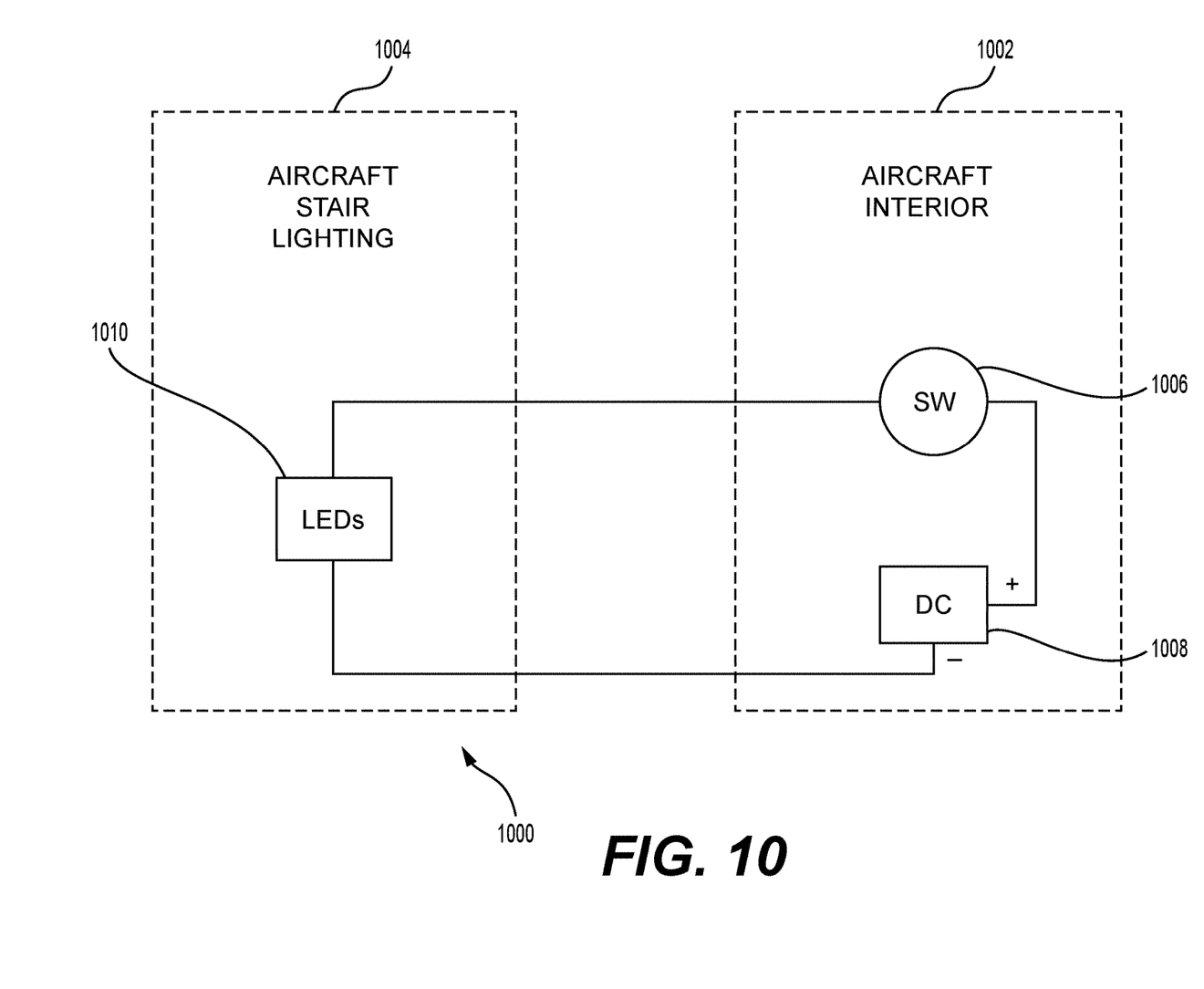
FIG. 10 is an electrical schematic showing LED connections made in an embodiment.

FIG. 10 reveals an electrical arrangement which, in embodiments, is configured to power LED strips (e.g., the four separate LED strips 210 of first lowest step 108); the identical upwardly directed LED strips (e.g., strip 210), and downwardly-directed strips (e.g., strip 420) included in each of steps 110, 112, 114, and 115 which are all supported electrically.

Many different arrangements of the various components depicted, as well as components not shown, are possible without departing from the spirit and scope of what is claimed herein. Embodiments have been described with the intent to be illustrative rather than restrictive. Alternative embodiments will become apparent to those skilled in the art that do not depart from what is disclosed. A skilled artisan may develop alternative means of implementing the aforementioned improvements without departing from what is claimed.

It will be understood that certain features and subcombinations are of utility and may be employed without reference to other features and subcombinations and are contemplated within the scope of the claims. Not all steps listed in the various figures need be carried out in the specific order described.

The invention claimed is:

1. A stairway lighting system for an aircraft entryway, comprising:
a deployable aircraft staircase including a plurality of steps including a first step and
a second step below and in front of the first step;
one or more first light sources located underneath a first traction-enhancing surface on the first step, the one or more first light sources configured to direct illumination up through one or more strip lenses incorporated into the first traction-enhancing surface and create a step edge indication;
one or more second light sources located underneath a front edge of the first traction-enhancing surface on the first step, the one or more second light sources being configured to direct illumination down onto a reflective face established into a riser existing below the first step, the reflective face being configured to reflect light received from the one or more second light sources and direct the light to illuminate a top surface of the second step.

2. The system of claim 1 wherein the stairway is supported by an integral fiberglass base portion.

3. The stairway lighting system of claim 1 wherein the one or more strip lenses are fabricated from a substantially translucent material.

4. The stairway system of claim 3 wherein the substantially translucent material comprises transparent mix of polycarbonate (PC) and an amorphous polyester.

5. The stairway lighting system of claim 1 comprising a plurality of lateral grooves included in the traction-enhancing surface.

6. The stairway lighting system of claim 1 wherein the second step includes a second traction-enhancing surface, and a door handle is incorporated into the second traction-enhancing surface.

7. The stairway lighting system of claim 6 comprising:
wherein a first direction indicator and a second direction indicator are both incorporated into the second traction-enhancing surface of the second step, the first direction indicator indicating a first direction to move the handle to lock the door, and the second direction indicator indicating a second direction to move the handle to unlatch the door.

8. The stairway lighting system of claim 7 wherein the first and second direction indicators suggest opposite rotational directions.

9. The stairway lighting system of claim 1 wherein the one or more first light sources are configured within a light module wherein the light module is incorporated underneath the first traction-enhancing surface such that light is presented up through the one or more strip lenses.

10. The stairway lighting system of claim 9 wherein the one or more first light sources are secured into a base plate using a plurality of clips wherein each base plate is configured to fit within the module.

11. The stairway lighting system of claim 9 wherein a first end cap secures a first end of the first light source, and a second end cap secures an opposite second end of the first light source.

12. The stairway lighting system of claim 1 wherein the first and second light sources each include at least one light emitting diode.

13. A stairway lighting system for an aircraft entryway, the system comprising:
a stairway, the stairway including a plurality of steps wherein a first step in the plurality includes a first traction-enhancing surface and a lower second step in the plurality includes a second traction-enhancing surface;
a first lighting module positioned underneath the first traction-enhancing surface of the first step, the first lighting module configured to illuminate a first laterally-extending lens; and
a second lighting module located underneath the first traction-enhancing surface of the first step, the second lighting module configured to direct illumination downward onto the second step.

14. The system of claim 13 wherein the second lighting module directs light downward through a second laterally-extending lens to illuminate at least a portion of the second step.

15. The system of claim 13 wherein the first and second traction-enhancing surfaces include grooves.

16. The system of claim 15 wherein the first laterally-extending lens located on the first step is located in front of a group of grooves located on the first traction-enhancing surface, the first laterally-extending lens configured to, when illuminated, indicate proximity to a first step edge.

17. The system of claim 13 comprising:
a reflective surface on a riser between the first and second steps, the reflective surface configured to reflect light received from the second lighting module onto an upper surface on the second step.

18. The system of claim 17 wherein the reflective surface on the riser includes a face that is downwardly and slightly outwardly angled.

19. The system of claim 14 wherein the second lens is constructed of substantially transparent polycarbonate, the first and second traction-enhancing surfaces are constructed of a thermoplastic polyurethane, and the first and second steps are consolidated into an injection-molded fiberglass base.

20. A deployable aircraft stairway for aircraft, the stairway comprising:
an upper step;
a lower step;
a reflective surface established on a wall rising up from a rear position of the lower step to a forward position underneath the upper step, the wall supporting the upper step;
a first light source embedded in structures in the upper step and configured to illuminate a lens located at the front of the upper step;
a second light source directing light onto the reflective surface established on the wall, the reflective surface configured to substantially illuminate the lower step.

* * * * *